United States Patent [19]

Gordon

[11] 4,134,006
[45] Jan. 9, 1979

[54] NAVIGATIONAL WIND EFFECT COMPUTER FOR AIRCRAFT

[76] Inventor: Willard F. Gordon, 2080 Green Canyon Rd., Fallbrook, Calif. 92028

[21] Appl. No.: 785,658

[22] Filed: Apr. 7, 1977

[51] Int. Cl.² ............................................. G06C 27/00
[52] U.S. Cl. ............................ 235/61 NV; 235/78 N; 235/88 N
[58] Field of Search ............. 235/61 NV, 78 N, 88 N, 235/84

[56] References Cited

U.S. PATENT DOCUMENTS

| | | | |
|---|---|---|---|
| 2,506,299 | 5/1950 | Isom | 235/61 NV |
| 2,901,167 | 8/1959 | Mudge | 235/61 NV |
| 3,126,151 | 3/1964 | Barry | 235/78 N |
| 3,360,195 | 12/1967 | Fisher | 235/88 N |
| 3,497,681 | 2/1970 | Warner | 235/61 NV |
| 3,609,299 | 9/1971 | Wright | 235/61 NV |
| 3,654,436 | 4/1972 | Sansom, Jr. | 235/61 NV |
| 3,693,872 | 9/1972 | Titus | 235/61 NV |
| 3,835,299 | 9/1974 | Twiney | 235/61 NV |

*Primary Examiner*—Stephen J. Tomsky
*Attorney, Agent, or Firm*—Edward A. Sokolski

[57] ABSTRACT

A device utilizing three discs, which are rotatably positionable relative to each other, is provided for computing aerial navigation wind correction angle and ground speed correction for various combinations of aircraft True Course, Wind Direction, Wind Velocity, and True Air Speed. The first disc, which for most effective utilization of the device is referenced to the longitudinal axis of an aircraft outline, has a first series of informational whole number scales running circularly therearound indicating wind correction angles for various wind velocities, and a second circularly arranged series of whole number scales indicating ground speed corrections for various wind velocities. The second of these discs provides a compass rose around its circumference which is positioned in accordance with the aircraft true course set at the longitudinal axis of the aircraft outline of the first disc, and upon which the third disc is positioned in accordance with the wind direction. The third disc, which overlies the second disc, has windows which overlie each of the two numbered scales of the first disc respectively and enable a read out of the precomputed whole number information.

8 Claims, 3 Drawing Figures

NAVIGATIONAL WIND EFFECT COMPUTER FOR AIRCRAFT

This invention relates to aircraft navigational wind effect computers, and more particularly to such a device utilizing a plurality of overlying relatively positionable discs.

In navigating an aircraft, it is necessary to account for the effect of the wind in determining both the ground speed, and the true heading of the aircraft relative to the ground. Various manually operable computers have been developed to solve this problem. Most of these, however, are somewhat complicated in their implementation so as to be difficult to understand and use, especially in the case of relatively inexperienced pilots. Many such computers often require marking, positioning and interpolating lined graphs. Additionally, many of the more sophisticated devices of this type mathematically compute the required answers through their physical construction. This makes for a device which is relatively complicated to learn to use, and so relatively difficult to operate and interpret that many pilots, once past the initial training and licensing phase, actually abandon flight planning, which is a detriment to flight safety.

The device of the present invention is of greatly simplified construction, with an ease of manipulation and interpretation for even the most inexperienced pilots. It provides an extremely accurate presentation of wind correction angle and ground speed correction data in whole number form. In view of the fact that the mathematical whole number data presented has been precomputed by an "IBM Type" computer printout for specified true air speed groupings, complicated line graph interpretation is not required, and data presentation is achieved by means of three relatively positionable displays, one of which has the precomputed whole number data for wind direction and velocity for specified true air speed categories for both the wind correction angles and ground speed corrections.

It is therefore an object of this invention to provide an aircraft navigational wind effect computer which is extremely simple to learn to use and interpret.

It is another object of this invention to provide an aircraft navigation wind effect computer that not only solves the problem but graphically shows the relationship between aircraft true course and wind direction.

It is another object of this invention to provide an aircraft navigational wind effect computer which is not only accurate but through its simplified use will facilitate accurate interpretation.

It is another object of this invention to provide an aircraft navigational wind effect computer which through its ease of use and comprehension will encourage continued flight planning in the interests of flight safety.

Other objects of this invention will become apparent as description proceeds in connection with the accompanying drawings, of which:

Briefly described, a preferred embodiment of the device of the invention is as follows: A computer is formed from three display members which are joined together at their centers in overlying relationship for rotatable positioning relative to each other.

The first member has two series of scales inscribed thereon, both of which run circularly around the member. One of these series of scales presents precomputed wind correction angles for various wind angles and velocities, while the second of these series of scales presents precomputed ground speed corrections for various wind angles and velocities, both scales computed for a specified true air speed. The first member also has a reference mark aligned with the aircraft longitudinal axis, which represents the true course of the aircraft, for setting the second member opposite.

The second of these members, which overlies the first, has a larger diameter than the other two and has a compass rose inscribed on its circumference. The inner portion of the second member is composed of a transparent material so as to allow for reading of the data on the first member.

The third member has a pair of radial windows, one for reading wind correction angles from the first member, the other for reading ground speed corrections from the first member. The third member also has a graphic pointer for positioning this member relative to the compass rose of the second member in accordance with wind direction. With the compass rose of the second member set in accordance with aircraft true course, as referenced on the first member, and the pointer of the third member set in accordance with wind direction, readings for correcting wind angle and ground speed are provided at each window respectively for various wind velocities with a predetermined specified aircraft true air speed.

In a second embodiment, the first member overlies the second member and the third overlies the first, there being no transparent inner portion required in the second member. In this second embodiment, the first member is preferably held stationary and the other two members adjustably rotated relative thereto in making readings. The operation of the second embodiment otherwise is the same as the first.

Figure 1:
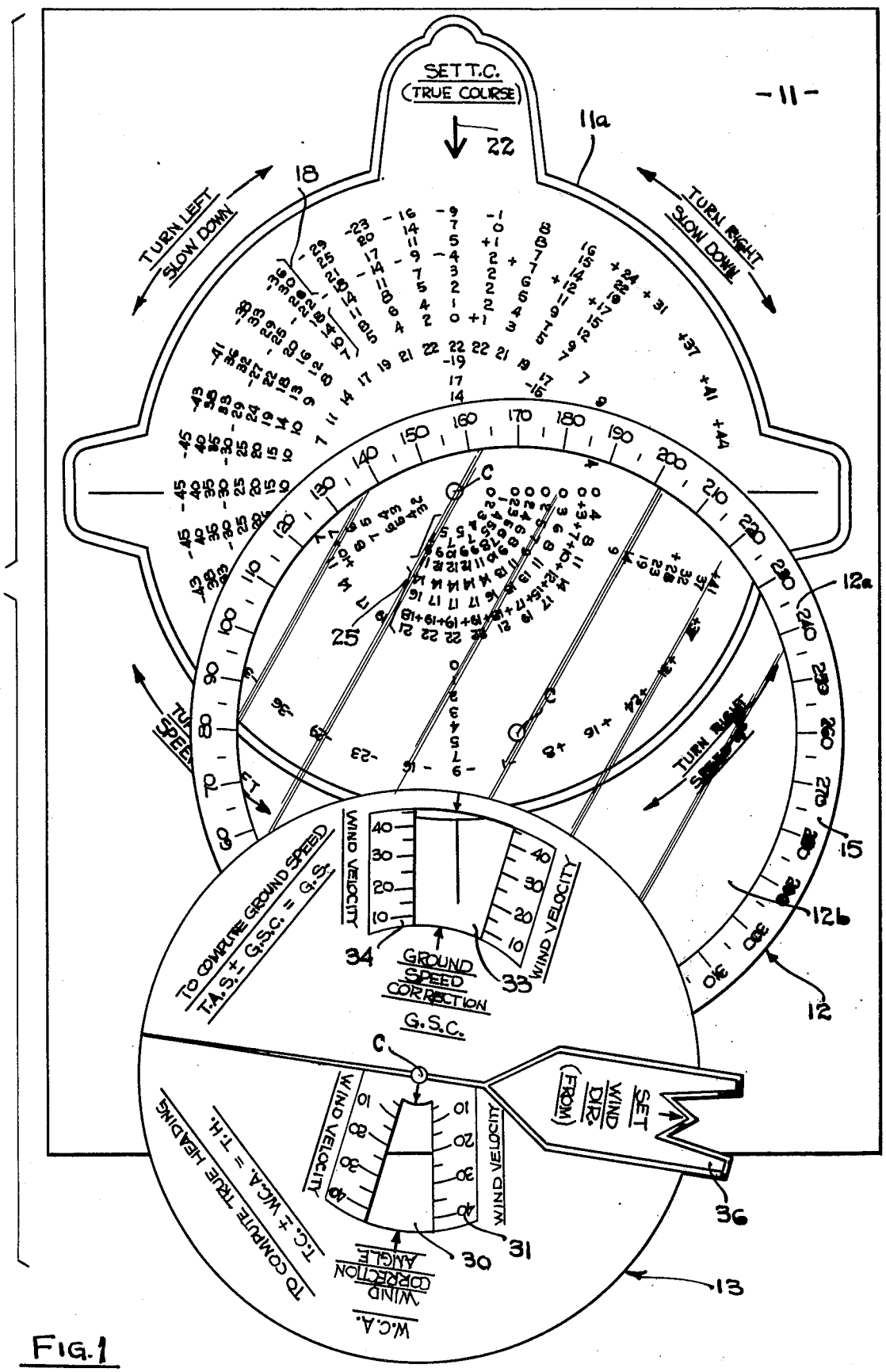
FIG. 1 is an exploded view of the preferred embodiment of the invention.

Referring to FIG. 1, a preferred embodiment of the invention as shown in an exploded view. Flat sheet members 11, 12 and 13 are joined together in overlying relationship at their centers, C, for rotatable positioning relative to each other by means of a pin, rivet or other suitable means (not shown). Member 11 is preferably a rectangular backing sheet having an image 11a representing an aircraft scribed thereon. Members 12 and 13 are preferably in the form of discs. Members 11–13 are preferably fabricated of a suitable light metal, plastic or heavy cardboard which is of durable construction. Disc 12 has a larger diameter than disc 13. Disc 12 has a compass rose formed on the outer ring portion 12a thereof with a numerical scale 15 indicating compass directions, reading clockwise in 10° intervals. The remaining inner portion 12b of this disc is composed of a transparent material.

Card 11 has an outer series of scales 18 running circularly around the card which represent computations for ground speed corrections. These computations are made for the particular true air speed and that value is indicated elsewhere on card 11. Columns of these scales are spaced at 10° intervals around the disc and represent ground speed corrections in whole number data for the various wind velocities indicated on disc 13, which are precomputed for the various combinations of aircraft true course and wind direction which they represent.

The data for the ground speed correction, GSC, is obtained from the following formula:

$$GSC = \sqrt{W^2 + T^2 - 2WT\cos(A-C)} \quad (1)$$

where
W = wind speed
T = true air speed
A = wind direction
C = wind correction angle.

A second series of scales 25 similarly runs circularly around the card and has columns spaced at 10° intervals. This inner series of scales represents wind correction angles, in whole number data, and is presented in a similar manner as for scales 18.

Scales 18 and 25 cover a surface area of member 11 substantially equal to the surface area of one side of disc 13.

The data for the wind correction angle, WCA, is obtained from the following formula:

$$WCA = ARCTAN\sqrt{\left(\frac{T^2}{T^2 - (W\sin(\pi - A)^2)}\right) - 1} \quad (2)$$

The various parameters being the same as designated for equation (1).

A minus sign (or color code) for any column indicates that the correction is subtractive, while a plus sign (or color code) indicates that the correction is additive. The scales for each of the various wind velocities are arranged in circles which are in concentricity with each other.

As this data is precomputed for a specified true air speed, when working problems for other true air speeds member 11 must be replaced with a similar member carrying data applicable to that true air speed. This can readily be achieved by fabricating the unit so that member 11 is a replaceable backing card, e.g. by using a removable center holding clip 40 (see FIG. 2).

Member 11 has a reference arrow 22 indicating the longitudinal axis of the aircraft and pointing opposite the direction of aircraft flight, which is used to position disc 12 relative to member 11, with arrow 22 pointing along scale 15 to indicate the true course of the aircraft.

For convenience of illustration, scales 18 and 25 have been only partially filled in but would, of course, completely cover the ten-degree interval columns running around the disc.

Disc 13 has a first radial window 30 near the central portion thereof, which is used to make readings of wind correction angle from the scale 25 of member 11. A wind velocity scale 31 is provided adjacent to window 30 to correspond to the various concentric scales 25 each of which, as already noted, is computed for a different wind velocity. A second window 33 having a wind velocity scale 34 identical to wind velocity scale 31, is also provided for making readings of ground speed correction in conjunction with the scales 18 of member 11. As for scale 31, the wind velocity indicia 34 are positioned to align with the associated data of scales 18. Disc 13 has a pointer 36 which is used to position disc 13 relative to disc 12 for each particular wind direction, the pointer 36 being set at a reading along scale 15 representing this wind direction.

Figure 2:
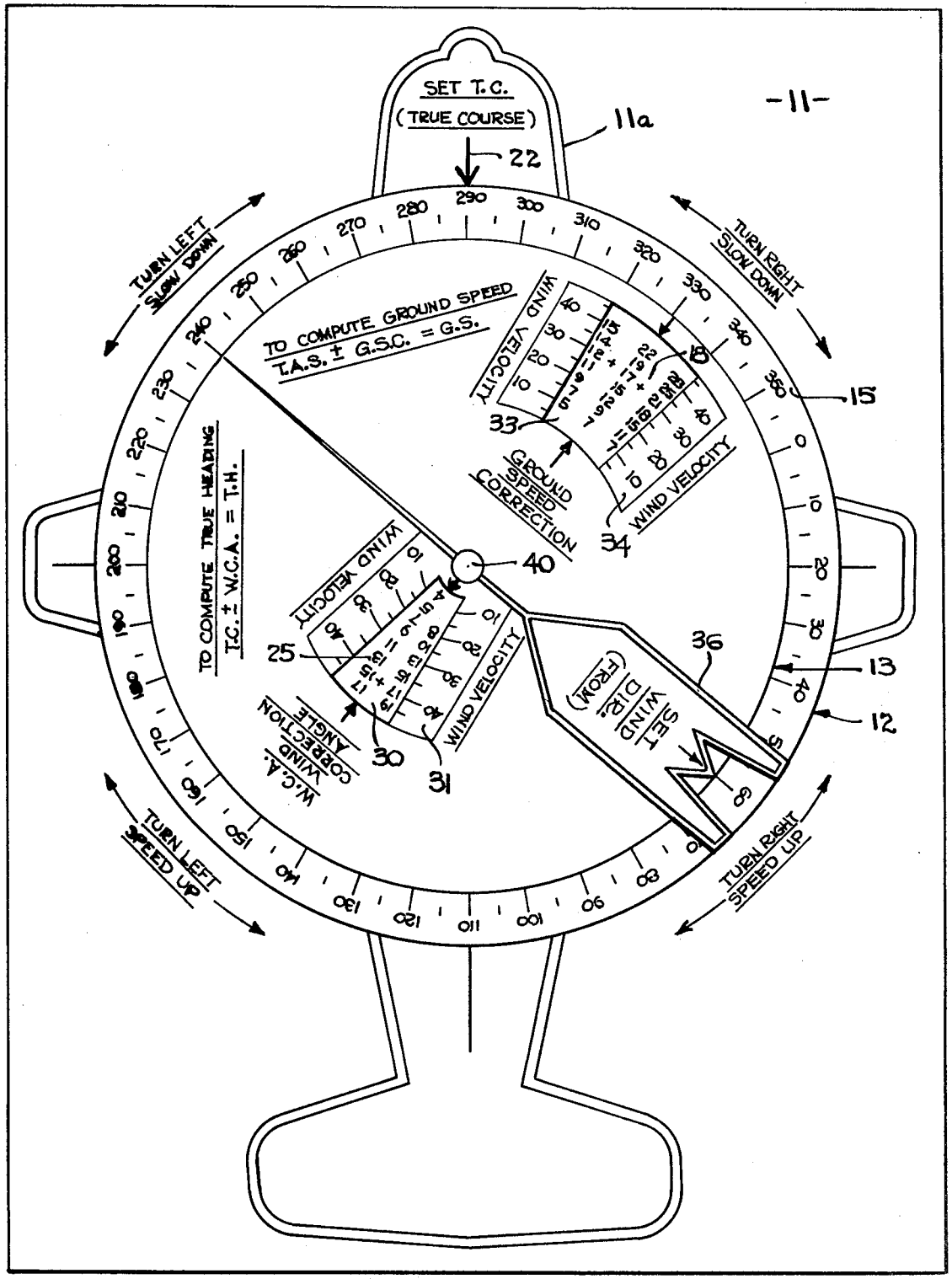
FIG. 2 is a plan view of the preferred embodiment showing the solution of an illustrative wind correction problem.

Referring now to FIG. 2, the preferred embodiment is shown in an operating position with the discs set relative to member 11 to solve a particular problem. The discs 12 and 13 and member 11 are joined together in their relatively rotatable positions by means of clip 40. For the purposes of the illustrative example we assume that the true course of the aircraft is 290°, the wind direction is 60° with the wind velocity being 30 knots, and the aircraft true air speed is 120 knots. Under such conditions, pointer 22 is set to 290° on scale 15 while pointer 36 is set to 60° on this scale. This provides a ground speed correction of +17 knots on scale 18, and a wind correction angle of +11° on scale 25. Thus the aircraft should be flown on a true heading of 301° (true course ± wind correction angle = true heading) (290° + 11 = 301°). The ground speed is computed as 137 knots. (True air speed ± ground speed correction = Ground speed) (120 knots + 17 knots = 137 knots).

Each computer, of course, is designed for use with particular types of aircraft of similar True Air Speed and the scales 25 and 18 should be computed for the normal cruising true air speed for that particular aircraft to facilitate the utilization of the device. If data charts 11 are prepared for true air speed variances of 10 knots/mph, the errors will be minimal and no greater than the errors of the existing type of wind effect computers. For greater accuracy, a chart for wind correction angle adjustments is included on member 11.

Figure 3:
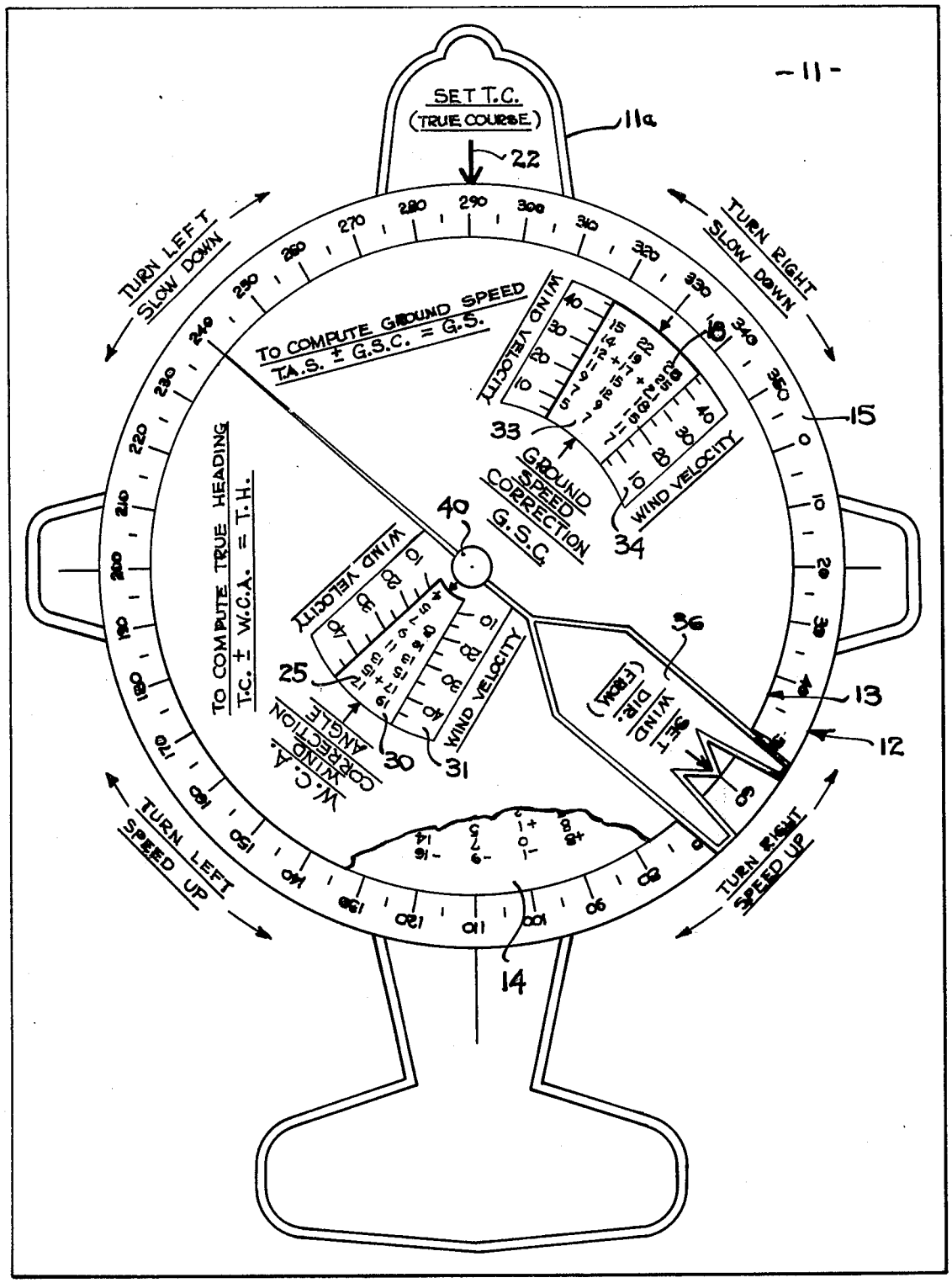
FIG. 3 is a plan view of a second embodiment of the invention.

Referring now to FIG. 3, a second embodiment of the invention is shown. This second embodiment differs from the first in that the backing member 11 does not carry the wind correction scales 25 or the ground speed correction scales 18, this information rather being carried by a member in the form of a third disc 14. Disc 14 is placed between discs 12 and 13 and is held fixed relative to backing member 11 in a predetermined position. There is no need for making the central portion of disc 12 transparent in view of the fact that the wind correction scales 25 and the ground speed correction scales 18 are carried above disc 12. Otherwise this second embodiment is the same as the first and operates in the same manner thereas.

While the invention has been described and illustrated in detail, it is to be clearly understood that this is intended by way of illustration and example only and is not to be taken by way of limitation, the spirit and scope of this invention being limited only by the terms of the following claims.

I claim:
1. A navigational computer for aircraft for computing wind correction angle and ground speed correction comprising:
a first member having a first series of scales representing precomputed ground speed corrections for various combinations of aircraft true course, wind direction and wind velocity for a specified true air speed, said first series of scales being arranged in a circle around said first member, and forming columns spaced at predetermined angular intervals, and a second series of scales representing wind correction angles computed for various aircraft true courses, wind directions and wind velocities for a specified true air speed similarly circularly spaced around said first member in columns at the same predetermined angular intervals as the first mentioned series of scales, said first member further having indicator means formed at a predetermined position thereon, a second member placed in concentric relationship with said first member, said second member having compass rose headings represented in a circle running therearound, said second member being rotatably positionable with respect to said first member, a third member positioned over the second and first members in concentricity therewith and having a first radial window located over the wind correction angle scales and a second radial window located over the ground speed correction scales, each of said windows having indicia arranged thereon corresponding to wind velocities and located opposite corresponding ones of the scales for wind correction angle and ground speed correction respectively, said third member further being rotatably positionable relative to said first and second members and having indicator means formed at a predetermined position thereon, whereby said second member is positioned with the indicator means of said first member located opposite a compass rose indication of the second member to represent aircraft true course, and the third member is positioned with the indicator means thereof along the compass rose scale of the second member at a position indicating wind direction, readings of ground speed correction and wind correction angle for various wind velocities being provided on said first member through the windows of said third member.

2. The computer of claim 1 wherein said first member comprises a backing sheet, said second and third members comprising discs rotatably mounted on said first member, with said second member overlying said first member and said third member overlying said second member, the center portion of the second member being transparent.

3. The computer of claim 2 wherein said first member is rectangular in configuration and has the outline of an aircraft scribed thereon.

4. The computer of claim 1 wherein all three of said members are discs, said first and third disc members having substantially the same diameter and said second disc member having a greater diameter than said first and third disc members.

5. The computer of claim 1 wherein the scales of each of the series of scales of said first member are arranged in concentric relationship to each other, each of said scales being aligned with a different wind velocity indicia along a corresponding one of the windows of said third member.

6. The computer of claim 1 wherein the first series of scales of said first member are located on an outer portion of said first member and the second series of scales are located on an inner portion of said first member.

7. A navigational computer for aircraft for computing wind correction angle and ground speed correction comprising:

a first member having a series of scales representing wind correction angle computed for various aircraft true courses, wind directions and wind velocities for a specified true air speed circularly spaced around said first member in columns at predetermined angular intervals, said first member further having indicator means formed at a predetermined position thereon, a second member placed in concentric relationship with said first member, said second member having compass rose headings represented in a circle running therearound, said second member being rotatably positionable with respect to said first member, a third member positioned over the second and first members in concentricity therewith and having a radial window located over the wind correction angle scales, said window having indicia arranged thereon corresponding to wind velocities and located opposite corresponding ones of the scales for wind correction angle, said third member further being rotatably positionable relative to said first and second members and having indicator means formed at a predetermined position thereon, whereby said second member is positioned with the indicator means of said first member located opposite a compass rose indication of the second member to represent aircraft true course, and the third member is positioned with the indicator means thereof along the compass rose scale of the second member at a position indicating wind direction, readings of wind correction angle for various wind velocities being provided on said first member through the window of said third member.

8. The computer of claim 7 and further including a second series of scales representing precomputed ground speed corrections for various combinations of aircraft true course, wind direction and wind velocity for a specified true air speed, said second series of scales being arranged in a circle around said first member and forming columns spaced at predetermined angular intervals, said third member having a second radial window located over the ground speed correction scales, said second window having indicia arranged thereon corresponding to wind velocities and located opposite corresponding ones of the scales for ground speed correction.

* * * * *